United States Patent [19]
Yang

[11] Patent Number: 4,717,132
[45] Date of Patent: Jan. 5, 1988

[54] VISE WITH SLIDING MOVABLE CLAMP SURFACE

[76] Inventor: Tai-Her Yang, 5-1, Tai-Pin Street, Kuang-Hwa Li, Si-Hu Jenn, Chang-Hwa Hsien, Taiwan

[21] Appl. No.: 872,270

[22] Filed: Sep. 25, 1986

[51] Int. Cl.4 .............................................. B25B 1/20
[52] U.S. Cl. ..................... 269/261; 269/258
[58] Field of Search ............. 269/258, 266, 261, 264, 269/259; 81/418, 424

[56] References Cited

U.S. PATENT DOCUMENTS

| | | | |
|---|---|---|---|
| 75,576 | 3/1868 | Prentiss | 269/258 |
| 113,656 | 4/1871 | Harwood | 269/259 |
| 1,059,545 | 4/1913 | Kunze | 269/296 |
| 1,649,567 | 11/1927 | Bruckmann | 269/258 |
| 2,407,990 | 9/1946 | Lurie | 269/258 |
| 2,502,124 | 3/1950 | Bray | 269/258 |
| 2,595,699 | 5/1952 | Petersen | 269/264 |
| 2,724,296 | 11/1955 | Parrish et al. | 269/258 |
| 2,894,548 | 7/1959 | Peck et al. | 269/258 |
| 2,945,523 | 7/1960 | Jenkins | 269/268 |
| 4,022,454 | 5/1977 | Bredvik | 269/258 |

FOREIGN PATENT DOCUMENTS 174872 10/1952 Austria .............................. 269/268

Primary Examiner—Robert C. Watson
Attorney, Agent, or Firm—Leonard Bloom

[57] ABSTRACT

It is an improved mechanism of vise; the feature of this invention is that on the two jaws of a vise, a sliding movable clamp piece is mounted for clamping a working piece having a plane surface, or irregular planes; in addition, said sliding movable clamp piece can automatically adjust its angular and eccentric sliding movement so as to tightly position a working piece on a vise.

2 Claims, 9 Drawing Figures

VISE WITH SLIDING MOVABLE CLAMP SURFACE

This application is a division of application Ser. No. 643,324, filed 09/14/84, now U.S. Pat. No. 4,632,374.

BACKGROUND OF THE INVENTION

The clamp surface of the conventional vise is usually a piece of plate (with ridges of file on the surface) being directly fixed to the jaws. In case of a working piece having irregular planes, the conventional vise can only clamp some points or lines of said working piece; consequently, the clamping is not stable and firm, and the processing work will be rather inconvenient, if not possible.

SUMMARY OF THE INVENTION

In view of the drawbacks of the conventional vise, this invention hereby provides a vise with sliding movable clamp surface, which can automatically adjust its clamp surfaces to the planes of a working piece until reaching an appropriate angle for firmly and stably clamping the working piece.

DESCRIPTION OF THE PREFERRED EMBODIMENT

The main feature of the present invention is the sliding movable clamp pieces (2,2') being fitted on the corresponding jaws on the vise (1).

Figure 1:
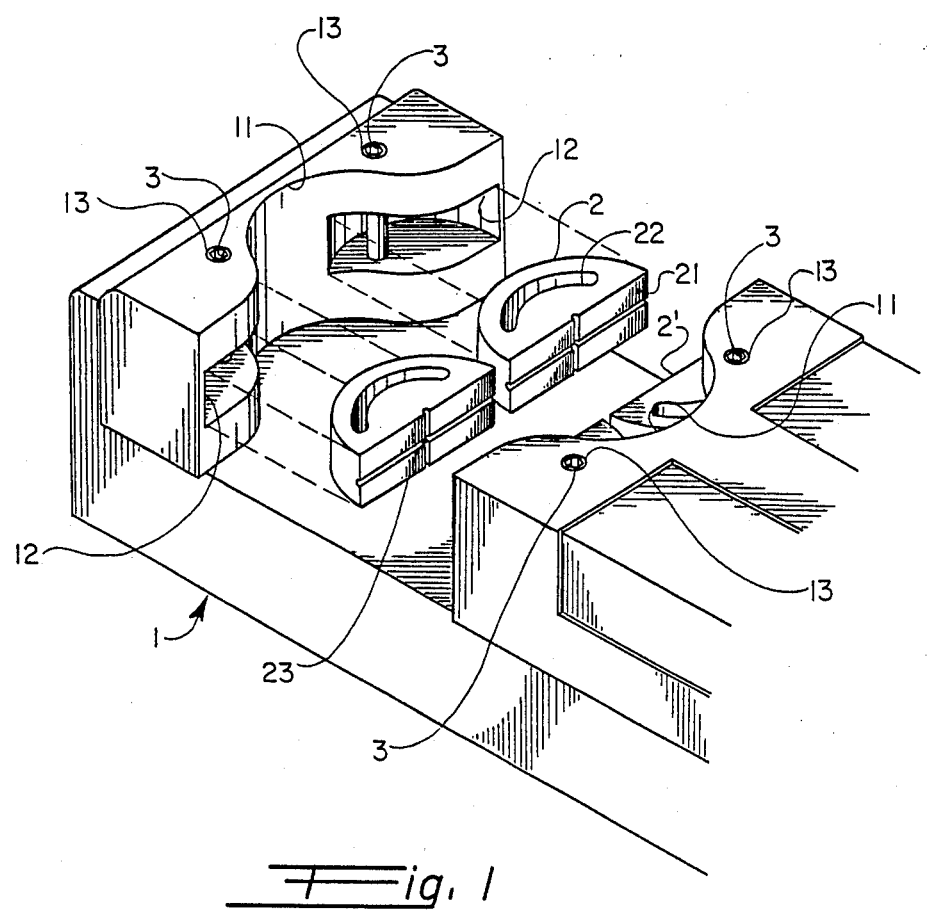
FIG. 1 is an isometric view of the vise in this invention.

As shown in FIG. 1, there are two sets of vise members. Each set has a pair of jaw members arranged laterally of one another. Each jaw member carries a sliding movable clamp piece (2) constituting a clamp member. The clamp member is in semi-circle shape with an appropriate arc-shaped thru slot (22) in the body, and with ridges (or cut) of file on the front clamp surface (21); in the center of said front clamp surface, there is a V-shaped cross groove (23). Along each jaw member, a semi-circle-shaped slot or channel (12) is provided for adequately housing each of said sliding movable clamp pieces (2) on a movable basis. On the both jaws, a vertical thru hole (13) thru the top and to the bottom of said semi-circle-shaped channel (12) is provided, and a portion of said thru hole (13) on the top of said semi-circle-shaped channel (12) is formed into a spot-faced hole so as to fit a countersunk bolt (3), constituting a pin which is freely and movably passing thru the arc-shaped thru slot (22) of said sliding movable clamp piece (2) for positioning purpose so as to have said clamp piece (2) moving eccentrically within said semi-circle-shaped channel (12) at an appropriate angle.

Moreover, on the corresponding side of the two jaws, if more than two said sliding movable clamp pieces (2) are furnished, a curved notch (11,11') between each pair of said sliding movable clamp pieces (2) should be provided.

Figure 2:
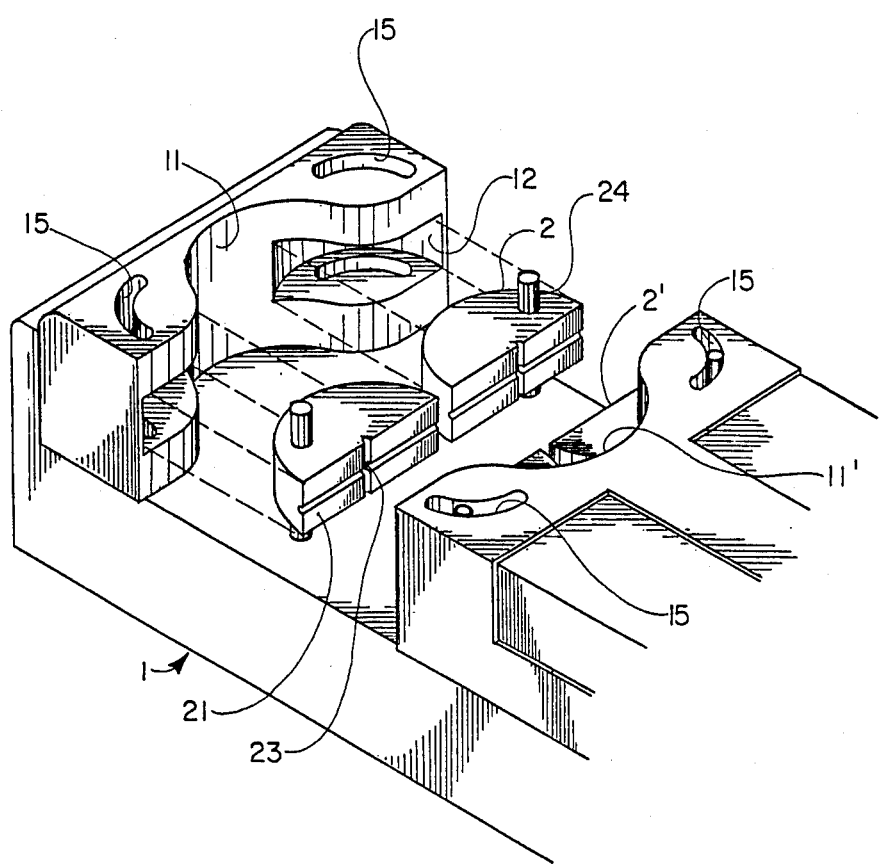
FIG. 2 shows an embodiment of the sliding movable clamp piece with studs in the vise of this invention.

As shown in FIG. 2, a stud (24) may be provided on both the top and the bottom of said sliding movable clamp piece (2) so as to be fitted inside an arc-shaped thru slot (15) provided in said semi-circle-shaped channel (12) of the vise (1) for eccentrically moving at an appropriate angle.

If a working piece having irregular planes is put between the jaws of a vise, mentioned above, said sliding movable clamp pieces (2) will, following the closing motion of the jaws, automatically adjust themselves to the contact planes of the working piece by sliding along said semi-circle-shaped channel (12) as a guide passage until its front clamp surface (21) locating an appropriate angle as the most stable fixing position.

Figure 3:
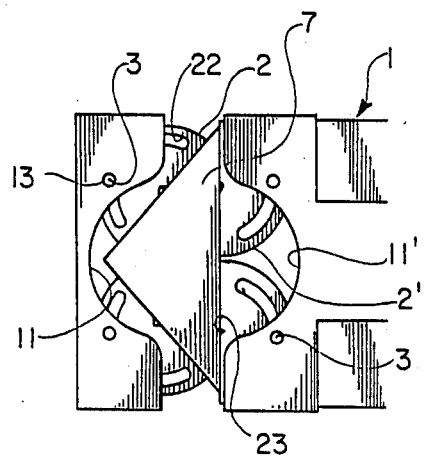
FIG. 3 shows an embodiment of this invention clamping a triangular working piece.
Figure 5:
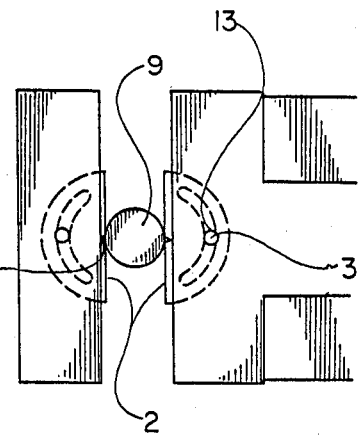
FIG. 5 shows an embodiment of this invention clamping a round working piece.

As shown in FIG. 3, an embodiment of the present invention is used for clamping a triangle-shaped working piece (7); the front clamp surface of the two sliding movable clamp pieces (2) on one jaw have automatically adjusted to an oblique angle respectively to one side of said working piece; at the same time, the front clamp surface (21) of said two sliding movable clamp pieces (2) on the opposite jaw have also closely contacted with one side of the working piece (7). Now, apply a little bit force to the jaws so as to have them closed to a limit of tightness, and the working piece (7) will be firmly clamped.

Figure 4:
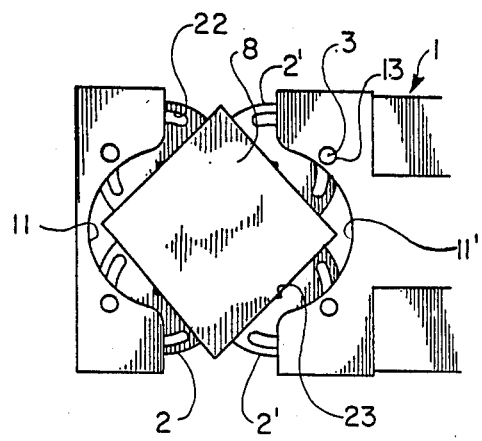
FIG. 4 shows an embodiment of this invention clamping a skew quadrilateral working piece.

In FIG. 4, when working piece (8) of skew quadrilateral is clamped with the present invention, each of the two said sliding movable clamp pieces (2) on the jaws is closely and respectively contacted with one side of said working piece (8) thru automatic adjustment of the angle of said front clamp surface (21). The clamping stability of the present invention is definitely much better than that of the conventional vise, which can only clamp two sides of a working piece.

As shown in FIG. 3, an embodiment of the present invention is clamping a round working piece (9) with the V-shaped cross groove (23) on the front clamp surface (21) of said sliding movable clamp piece (2); since said V-shaped cross groove (23) has a clutch effect to the circumference of said working piece, the clamp stability to the working piece (9) is unique.

The total number of said sliding movable clamp piece (2) to be furnished to the jaws of the present invention may be varied in accordance with the actual work requirement.

Said sliding movable clamp piece (2) may be furnished to a vise with the same number on both jaws, or with different number on the both jaws, or with some of them on one jaw only; in addition, the total number of said semi-circle-shaped channel (12) and said thru hole (13) for positioning said sliding movable clamp piece (2) may also be determined in accordance with the actual requirement so as to be freely selected by the number of said sliding movable clamp piece (2) to be used.

Figure 6:
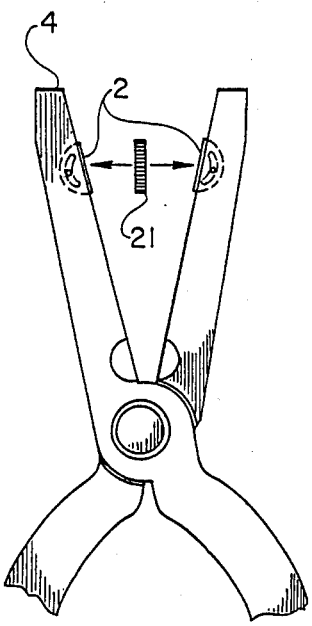
FIG. 6 shows said sliding movable clamp piece in this invention being mounted on a hand tool vise.
Figure 8:
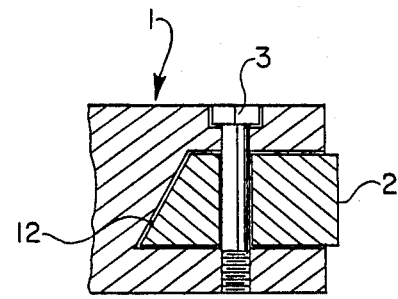
FIG. 8 shows a sectional view of a slantingly coupling surface between said sliding movable clamp piece and said semi-circle-shaped channel in this invention.
Figure 7:
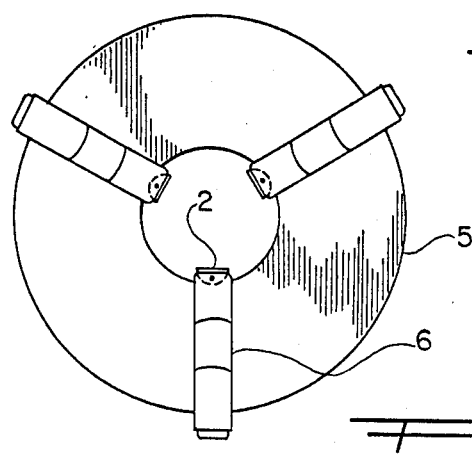
FIG. 7 shows said sliding movable clamp piece in this invention being mounted on the jaws of a lathe chuck.
Figure 9:
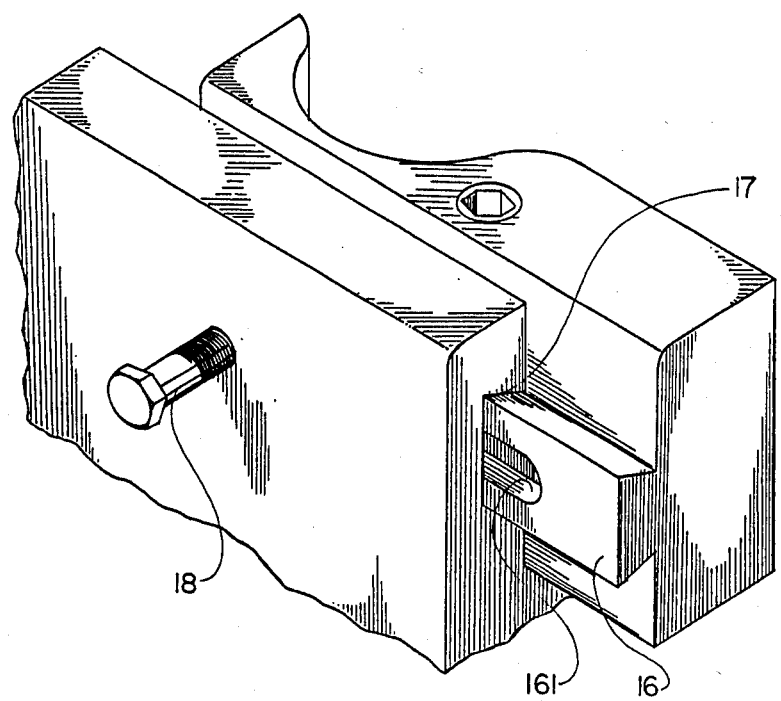
FIG. 9 shows an embodiment of the sliding clamp base of the vise in the present invention.

The vise described in the present invention should not be limited to the bench vise, or the lathe vise; it should include the sliding movable clamp piece (2) on all hand vises (as shown in FIG. 6), or on the jaws (6) of a lathe chuck (5) (as shown in FIG. 7) for clamping a working piece having irregular surfaces in a more convenient and stable manner than a conventional one. As shown in FIG. 8, the coupling surface between said sliding movable clamp piece (2) and said semi-circle-shaped channel (12) of the present invention may be a slant line for the purpose of yielding an angular lock effect.

I claim:

1. In a vise assembly including a substantially planar base having an end portion, an upwardly-extending portion formed integrally with the end portion of the planar base and perpendicularly thereof, a first vise member mounted on the base and disposed against the upwardly-extending portion of the base, and a second vise member mounted on the base for movement towards and away from the first vise member in a direction substantially longitudinally of the base, the improvement which comprises, in combination, each of the vise members having a pair of convex vise faces separated by a concavely curved notch therebetween, each of the convex vise faces having a substantially semi-circular blind channel formed therein and opening into the concavely curved notch, each of the channels being defined within a pair of planes which are substantially parallel to each other and to the planar base, a movable clamp member within each of the channels and extending partially into the concavely curved notch, each of the clamp members being substantially semi-circular in plan outline, a fixed pin carried by each of the clamp members and extending therefrom perpendicularly thereof, each of the convex vise faces having an arcuate slot formed therein to receive a respective pin, each of the arcuate slots extending substantially of its respective vise face, each of the clamp members being adapted to move independently of the other clamp members and about a respective rotational axis eccentrically of its respective pin, each of the clamp members having a planar clamping face, wherein a total of four clamp members are provided and are arranged in two pairs, one pair for each vise member, wherein the clamp members in each vise member are co-planar and are arranged laterally of each other, each clamp member having a given radius, and the rotational centers of an adjacent pair of clamp members being separated by a maximum of two given radii plus sliding clearance, whereby a cylindrical workpiece whose diameter is only slightly larger than the sliding clearance may be gripped upright by the four clamp members substantially perpendicularly of the planar base of the vise assembly.

2. The improvement of claim 1, further including means providing the first vise member with a limited sliding movement parallel to the planar base and transverse to the direction of movement of the second vise member, said means including a limited sliding dovetail connection between the first vise member and the upwardly-extending integral portion of the planar base.

* * * * *